United States Patent
Ahmed

[11] Patent Number: 6,017,369
[45] Date of Patent: Jan. 25, 2000

[54] DIESEL FUEL COMPOSITION

[75] Inventor: Irshad Ahmed, Plainsboro, N.J.

[73] Assignee: Pure Energy Corporation, New York, N.Y.

[21] Appl. No.: 09/197,711

[22] Filed: Nov. 23, 1998

[51] Int. Cl.$^7$ .................................. C01L 1/18; C01L 1/32
[52] U.S. Cl. ............................... 44/302; 44/388; 44/418; 44/443
[58] Field of Search ............................. 44/302, 301, 388, 44/443, 418

[56] References Cited

U.S. PATENT DOCUMENTS

| | | | |
|---|---|---|---|
| 3,876,391 | 4/1975 | McCoy et al. | 44/301 |
| 4,083,698 | 4/1978 | Wenzel et al. | 44/302 |
| 4,297,107 | 10/1981 | Boehmke | 44/302 |
| 4,451,265 | 5/1984 | Schwab | 44/302 |
| 4,477,258 | 10/1984 | Lepain | 44/51 |
| 4,504,276 | 3/1985 | Baker | 44/302 |
| 4,509,950 | 4/1985 | Baker | 44/302 |
| 4,744,796 | 5/1988 | Hazbun et al. | 44/302 |
| 5,104,418 | 4/1992 | Genova et al. | 44/302 |
| 5,746,785 | 5/1998 | Moulton et al. | 44/443 |

FOREIGN PATENT DOCUMENTS 2217229  10/1989  United Kingdom .

*Primary Examiner*—Jacqueline V. Howard
*Attorney, Agent, or Firm*—Marshall, O'Toole, Gerstein, Murray & Borun

[57] ABSTRACT

A splash-blendable, solubilized diesel fuel composition includes a diesel fuel, ethanol, an alkyl ester of a fatty acid, a stabilizing additive and, optionally, a co-solvent. The stabilizing additive is either a mixture of fatty acid alcohols, a polymeric material, or a combination of the mixture and the polymeric material.

14 Claims, No Drawings

DIESEL FUEL COMPOSITION

BACKGROUND OF THE INVENTION

1. Field of the Invention

The invention relates to a diesel fuel composition for use in internal combustion engines.

2. Brief Description of Related Technology

Conventional diesel fuels are used throughout the United States and the world in internal combustion engines to power a wide variety of vehicles such as, for example, farm equipment, passenger cars, buses, trucks, and construction equipment. There are generally two conventional diesel fuels used in these types of vehicles, i.e., No. 1 diesel fuel and No. 2 diesel fuel. Conventional diesel fuels, however, are disfavored by consumers because of the loud engine noise and harmful emissions (smoke) caused by the combustion of the fuel, and the hard starting in cold weather conditions. Accordingly, gasoline has gained widespread use and today dominates the market for fuels used in combustion engines. Diesel combustion engines, however, provide significant advantages over engines using gasoline fuels, including improved energy efficiencies.

Hybrid diesel fuel formulations have been developed to address various problems associated with diesel fuels and their combustion. For example, for purposes of economics, combustion characteristics, and availability, ethanol has been used in hybrid diesel fuel formulations. While anhydrous ethanol and diesel fuel are miscible at room temperature, trace amounts of water in the mixture may cause phase separation when the ethanol is mixed with the diesel fuel. Furthermore, as the temperature is lowered, the fuel's tolerance to take on water is diminished. Water present in the diesel fuel undesirably separates from the fuel to form an immiscible layer. This water aggregate is undesirable as it leads to erratic combustion, poor combustion emissions, and could corrode components of the fuel delivery system and combustion engine.

Hybrid diesel fuel emulsions and microemulsions have been developed to improve the water tolerance of diesel fuels. Such emulsions and microemulsions include, for example, a mixture of the diesel fuel, water, an alcohol, and a combination of surface-active agents made up of a variety of salts of long-chain fatty acids. See e.g., U.S. Pat. No. 4,083,698. U.S. Pat. No. 4,451,265 describes a microemulsion containing diesel fuel, water, water-miscible alcohols, and a surfactant system using N,N-dimethyl ethanolamine and a long-chain fatty acid substance. A major disadvantage of emulsion and microemulsion fuel formulations, however, is the lack of stability (i.e., temperature and time stability) under the type of conditions which the fuel formulations can be expected to encounter. In general, microemulsions have a tendency to de-emulsify under increased pressures, such as those experienced in compression-ignition diesel engines. Microemulsions also have a tendency to de-emulsify at high and low temperatures. Efforts to stabilize microemulsions over a temperature range of −20° C. to +70° C. are taught by U.S. Pat. No. 4,744,796. Regardless, of these advances, however, emulsions and microemulsions have physical properties which limit their use in unmodified combustion engines.

Additionally, hybrid diesel fuel formulations require time-intensive and energy-intensive preparation procedure(s). Because it is very difficult to homogenize a mixture of a low molecular weight alcohol, such as ethanol, and higher molecular weight hydrocarbons, such as diesel fuel, most emulsion and microemulsion fuels require expensive blending operations employing an emulsifying agent. For example, such emulsions are typically prepared by vigorous mixing, recirculating, and heating (e.g., to a temperature of about 50° C. for about 20 minutes to provide a homogenized emulsion, usually opaque in appearance.

Accordingly, it would be desirable to provide a temperature- and time-stable, clear diesel fuel composition for use in combustion engines, and preferably unmodified combustion engines, that more closely emulates the physical properties of conventional diesel fuel, yet employs less of the actual base diesel fuel. Additionally, it would be desirable to provide a diesel fuel formulation that can accommodate water contamination. Furthermore, it would be desirable to provide a fuel composition that has improved emissions as compared to a base diesel fuel (either No. 1 diesel fuel or No. 2 diesel fuel). Still further, it would be desirable to provide a fuel composition that can be prepared readily without the need for energy-intensive blending procedures

SUMMARY OF THE INVENTION

The invention is directed to a solubilized fuel composition. The components of the fuel solution include a diesel fuel, ethanol, an alkyl ester of a fatty acid, a stabilizing additive and, optionally, a co-solvent. The stabilizing additive is either a mixture, a polymeric material, or a combination of the mixture and the polymeric material, depending upon a variety of factors including the diesel fuel cetane number and the amount of water present in the solution, for example.

The stabilizing additive may be a mixture including two different ethoxylated fatty alcohols having a hydrocarbon chain length of about 9 to about 13 carbon atoms present in a molar ratio with respect to each other of about 1:3 to about 3:1, inclusive. The mixture also includes 0 volume percent (vol. %) to about 10 vol. %, inclusive, based on the volume of the mixture, of a cetane booster, and less than about 5 vol. % of a demulsifier based on the volume of the mixture. The stabilizing additive may be a polymeric additive that is a reaction product of (a) a mixture of an ethoxylated alcohol and an amide, wherein the ethoxylated alcohol includes at least about 75 weight percent of at least one linear straight chain alcohol having a hydrocarbon chain length of about 9 to about 15 carbon atoms, and wherein the amide is a substantially equimolar reaction product of an alcohol amine and an alkyl ester of a fatty acid; and, (b) an ethoxylated fatty acid or derivative thereof having a hydrocarbon chain length of about 9 to about 15 carbon atoms.

The cosolvent, when present, is selected from the group consisting of alkyl alcohols having a hydrocarbon chain length of about three to about six, inclusive, such as tertiary butyl alcohol, naphtha, γ-valerolactone, kerosene, hydrocarbons having a chain length of greater than about 50, and mixtures thereof Typically, the diesel is present in the solution in an amount of about 60 vol. % to about 89 vol. %, the ethanol is present in the solution in amount of about 10 vol. % to about 18 vol. %, the alkyl ester of a fatty acid is present in the solution in an amount of about 0.1 vol. % to about 4.5 vol. %, and the co-solvent is present in the solution in an amount of about 0 vol. % to about 10 vol. %, based on the total volume of the composition.

Further aspects and advantages of the invention may become apparent to those skilled in the art from a review of the following detailed description, taken in conjunction with the examples and the appended claims. It should be noted that while the invention is susceptible of embodiments in various forms, described hereinafter are specific embodiments of the invention with the understanding that the present disclosure is intended as illustrative, and is not intended to limit the invention to the specific embodiments described herein.

DETAILED DESCRIPTION OF THE INVENTION

A solubilized diesel fuel composition according to the invention is a solution that includes a diesel fuel, ethanol, an alkyl ester of a fatty acid, a stabilizing additive and, optionally, a co-solvent. The stabilizing additive is either a mixture, a polymeric material, or a combination of the mixture and the polymeric material, depending upon a variety of factors including the diesel fuel cetane number and the amount of water present in the solution, for example. The stabilizing additive also may be considered a blending additive as it allows "splash" blending of the ethanol with the diesel fuel without the need for extensive mechanical mixing, recirculating, and/or heating.

The stabilizing additive may be a mixture including two different ethoxylated fatty alcohols having a hydrocarbon chain length of about 9 to about 13 carbon atoms present in a molar ratio with respect to each other of about 1:3 to about 3:1. The mixture also includes 0 vol. % to about 10 vol. %, inclusive, based on the volume of the mixture, of a cetane booster, and less than about 5 vol. % of a demulsifier based on the volume of the mixture. The polymeric stabilizing additive is a reaction product of (a) a mixture of an ethoxylated alcohol and an amide, wherein the ethoxylated alcohol includes at least about 75 weight percent of at least one linear straight chain alcohol having a hydrocarbon chain length of about 9 to about 15 carbon atoms, and wherein the amide is a substantially equimolar reaction product of an alcohol amine and an alkyl ester of a fatty acid; and, (b) an ethoxylated fatty acid or derivative thereof having a hydrocarbon chain length of about 9 to about 15 carbon atoms.

The cosolvent, when present, is selected from the group consisting of alkyl alcohols having a hydrocarbon chain length of about three to about six, inclusive, such as tertiary butyl alcohol, naphtha, γ-valerolactone, kerosene, a hydrocarbon having a chain length of greater than about 50, and mixtures thereof.

Generally, the diesel fuel is present in the solution in an amount of about 60 volume percent (vol. %) to about 89 vol. %, inclusive, the ethanol is present in the solution in amount of about 10 vol. % to about 18 vol. %, inclusive, the alkyl ester of a fatty acid is present in the solution in an amount of about 0.1 vol. % to about 4.5 vol. %, inclusive, and the co-solvent is present in the solution in an amount of about 0 vol. % to about 10 vol. %, inclusive, based on the total volume of the composition.

Any diesel fuel may be used in the inventive fuel composition depending on the given engine application, however, Diesel fuel No. 1 and/or a No. 2 diesel fuel are preferably used in the inventive fuel composition. Diesel fuel generally is obtained from the distillation of petroleum. Its efficiency is measured by the cetane number. Suitable diesel fuels for use in accordance with the invention generally have a cetane rating of about 25 to about 50, preferably about 30 to about 40. The amount of diesel fuel blended to form the inventive fuel composition preferably is present in the solution in a range of about 61 vol. % to about 89 vol. %, inclusive, based on the total volume of the fuel composition. In one preferred embodiment, the amount of diesel is present in the solution in a range of about 72 vol. % to about 89 vol. %, more preferably about 78.5 vol. % to about 86 vol. %, and most preferably about 82.6 vol. % to about 85 vol. % based on the total volume of the fuel composition. In another preferred embodiment, the amount of diesel is present in the solution in a range of about 60 vol. % to about 84 vol. %, and more preferably about 67 vol. % to about 78.5 vol. %, and most preferably about 69 vol. % to about 74.6 vol. % based on the total volume of the fuel composition.

The inventive fuel composition also includes ethanol. Ethanol typically is produced by fermentation of sugars derived from grains or other biomass materials. Ethanol suitable for use in accordance with the invention preferably includes fuel grade ethanol derived from yeast or bacterial fermentation of starch-based six-carbon sugars. Such starch-based six-carbon sugars may be extracted from corn, sugarcane, and sugar beet. Alternatively, fuel grade ethanol may be produced via known dilute and/or concentrated acid and/or enzymatic hydrolysis of a particular biomass material known as lignocellulosic material. Biomass may be collected from waste industrial sources including, for example, cellulosic portions of municipal solid waste, including waste paper, paper sludge, saw dust. Additionally, biomass may be collected from agricultural residues including, for example, rice husks, bagasse, and paper-mill sludge.

A suitable fuel grade ethanol for use in accordance with the invention may contain about 0.8 to about 1.2 percent by weight water (referred to hereafter as "anhydrous ethanol"). Alternatively, another fuel grade ethanol suitable for use in the invention may contain higher amounts of water, up to about five percent by weight (referred to hereafter as "hydrous ethanol"). When hydrous fuel grade ethanol is blended in accordance with the invention, the preferred stabilizing additive is the reaction product of (a) a mixture of an ethoxylated alcohol and an amide, wherein the ethoxylated alcohol includes at least about 75 weight percent of at least one linear straight chain alcohol having a hydrocarbon chain length of about 9 to about 15 carbon atoms, and wherein the amide is a substantially equimolar reaction product of an alcohol amine and an alkyl ester of a fatty acid, and (b) an ethoxylated fatty acid or derivative thereof having a hydrocarbon chain length of about 9 to about 15 carbon atom. The particular reactants comprising this additive and their specific proportions are determined by the make-up of the fuel composition, for example the amount of water present in the composition. The particular additive is described in more detail below.

Heretofore, use of a hydrous ethanol in combination with a diesel fuel posed problems wherein the ethanol/diesel fuel mixture would undesirably separate into two distinct phases and render the resultant mixture unsuitable for use as a combustible fuel. In combination with the particular additive (and the co-solvent, when present), hydrous ethanol may be blended satisfactorily with conventional diesel fuel without forming two phases. Quite surprisingly, it has been found that hydrous fuel grade ethanol blended in accordance with the invention may impart desirable combustion characteristics to the overall fuel composition, such as improved fuel stability, lower particulate matter and $NO_x$ emissions, improved antiknock characteristics, and/or improved antifreeze characteristics.

Generally, the amount of fuel grade ethanol blended to form the inventive fuel composition preferably is in a range of about 10 vol. % to about 20 vol. %, inclusive, based on the total volume of the fuel composition. In a preferred embodiment, the amount of fuel grade ethanol is present in the solution in a range of about 10 vol. % to about 18 vol.

%, and more preferably about 13 vol. % to about 16 vol. %, and most preferably about 14 vol. % to about 15 vol. % based on the total volume of the fuel composition.

A preferable co-solvent is a material selected from the group comprising, consisting essentially of, and/or consisting of alkyl alcohols having a hydrocarbon chain length of about three to about six, inclusive, such as tertiary butyl alcohol, naphtha, γ-valerolactone, kerosene, hydrocarbons having a chain length of greater than about 50, and mixtures thereof. The co-solvent may be acquired from petrochemical sources and/or renewable sources derived from biomass materials. The co-solvent used in the invention is present in the solution in small quantities, if used at all, when compared to other fuel composition constituents, such as the diesel fuel and ethanol. It should be noted that the co-solvent is not necessary to achieve the desired results. Presence of the co-solvent, however, provides desirable time and temperature stability buffers for ethanol and hydrocarbon components of the fuel composition. Presence of the co-solvent also enhances certain key properties of the blended fuel composition, such as fuel lubricity and fuel flow properties (e.g., viscosity), which raise a regular-grade fuel quality to that of premium-grade specifications.

Generally, the amount of co-solvent blended to form the inventive fuel composition preferably is in a range of 0 vol. % to about 10 vol. %, inclusive, based on the total volume of the fuel composition. More preferably, however, the amount of co-solvent is present in the solution in a range of about 6 vol. % to about 8 vol. %, and most preferably about 6.9 vol. % to about 7.5 vol. %, based on the total volume of the fuel composition.

The inventive fuel composition also includes a stabilizing additive to, among other things, homogenize the constituents of the fuel composition. The additive is selected from two groups of materials, one of which is a polymeric material, and the other being a mixture of fatty acid alcohols, a cetane booster, and a demulsifier. The stabilizing additive may also include a combination of the mixture and the polymeric material. Generally, the additive is present in the solution in a range of about of about 0.5 vol. % to about 10 vol. %, inclusive, based on the total volume of the fuel composition.

When the composition contains no co-solvent, the preferred stabilizing additive is the polymeric additive, described below, and is present in the solution in an amount of about 0.5 vol. % to about 10 vol. %, inclusive, based on the total volume of the composition. More preferably, the polymeric additive is present in an amount of about 0.7 vol. % to about 5.35 vol. %, and most preferably about 1.2 vol. % to about 2.25 vol. %, based on the total volume of the composition.

When the composition contains a co-solvent, then the stabilizing additive may be the mixture alone, the polymeric material alone, or a combination of the mixture and the polymeric material. In such a case, the stabilizing additive is present in the solution in an amount of about 0.5 vol. % to about 7.5 vol. %, inclusive, based on the total volume of the composition. More preferably, the polymeric additive is present in the solution in an amount of about 1 vol. % to about 6 vol. %, and most preferably about 3 vol. % to about 6 vol. %, based on the total volume of the composition.

The polymeric material includes an ethoxylated alcohol comprising at least about 75 weight percent of at least one linear, straight-chain alcohol having a hydrocarbon chain length of about nine to about fifteen carbon atoms, and a substantially equimolar (with respect to the alcohol) amount of an amide formed by reacting an alcohol amine with an equimolar amount of an alkyl ester of a fatty acid, preferably at a reaction temperature of about 100° C. to about 110° C. Still further, the material includes an equimolar amount of an ethoxylated fatty acid formed by reacting an unmodified fatty acid with ethylene oxide. Preferably, the material includes equimolar amounts of each of the ethoxylated alcohol, amide, and ethoxylated fatty acid.

The material and methods for the manufacture of the polymeric material are described in more detail in co-pending, commonly-assigned U.S. patent application Ser. No. 08/953,809 filed on Oct. 20, 1997, the disclosure of which is hereby incorporated herein by reference. Briefly, the material is prepared by forming a reaction product of substantially equimolar amounts of the ethoxylated alcohol and the amide, preferably at a temperature of about 55° C. to about 58° C., and subsequently isothermally reacting the resulting product with an equimolar amount of the ethoxylated fatty acid. In preparing the material, the ethoxylated alcohol and fatty acid act as monomers while the amide serves as the chain initiator. Each of the alcohol, amide, and fatty acid may be dissolved in a solvent for purposes of facilitating the industrial-scale manufacture of the polymeric material.

The unmodified fatty acid and the alcohol are ethoxylated using an ethoxylating agent, such as ethylene oxide, prior to forming the material. The overall degree of ethoxylation of the material preferably is maximized to achieve maximum water solubilization without detrimentally affecting the performance characteristics of the fuel composition. Increasing the degree of ethoxylation likely results in an undesirable phase change of the ethoxylated higher alcohols and fatty acids from a liquid to a solid limiting its application to the fuel composition. The disadvantage of having a lower degree of ethoxylation is that higher quantities of the material are required to achieve a desired result. Higher concentrations of the material in a given application are limited both by cost and legal regulations. For example, any substance added in quantities above 0.25 percent must be reported with its full life-cycle evaluation under environmental regulations which could further limit the commercial viability of the polymeric material.

Commercially-available sources of alcohols utilize both straight-chain and branched-chain synthetic alcohols (i.e., isomers) and/or naturally-occurring alcohols such as oleic, lauric, palmitic, stearic, and other alcohols of higher fatty acids. Commercially available alcohols, such as SYNPERONIC 91/2.5 and SYNPERONIC A3, which are manufactured by ICI Chemicals, and DOBANAL 91/2.5, which is manufactured by Shell Chemical, contain large quantities of isomers. For example, the SYNPERONIC class of alcohols contain as much as 50 weight percent branched isomers. Presence of branched isomers in the polymeric material is undesirable because branched isomers limit the degree of ethoxylation that can be achieved before the onset of a phase change from a liquid to a solid.

The NEODOL class of alcohols, such as the NEODOL 91–2.5 and NEODOL 1–3 products, have low concentrations of branched isomers, and typically have a linear, straight-chain alcohol concentration of about 75 weight percent to about 85 weight percent and an average molecular weight of 160. (The NEODOL class of alcohols are ethoxylated to 2.5 or 3.0 degrees of ethoxylation per mole of alcohol as represented by the "91–2.5" and "1–3," respectively.) Most other commercially available alcohols have molecular weights exceeding 200. It has been determined, however, that lower molecular weight alcohols will permit a higher degree of ethoxylation without the onset of a phase change from a liquid to a solid. Thus, the ethoxylated alcohol preferably should have a molecular weight of less than about 200, and highly preferably less than about 160. Attempts to achieve a higher degree of ethoxylation with a higher molecular weight alcohol would result in the onset of a phase change at lower concentrations of the ethoxylating agent then with a lower molecular weight alcohol.

The material is prepared using ethoxylated alcohols having as low a concentration of branched-chain molecules as possible. The ethoxylated alcohol used in the preparation of the material should also have as large a chain length as possible without increasing the viscosity so much that a phase change occurs, the onset of which is typically indicated by increased surface tension. Increased surface tension of higher alcohols results in the solidification of the material and suppresses the blending and performance characteristics of the fuel.

Conventional amides are prepared by reacting a fatty acid with an alcohol amine in a 2:1 molar ratio at a temperature between 160° C. and 180° C. Such amides, however, are contaminated with free amines, which are not conducive to ethoxylation. It has been discovered that a superamide works better then conventional amides (such as, ethanolamide, diethanolamide, and triethanolamide) in the preparation of the polymeric material. Superamides for use in the polymeric material are preferably prepared by heating an alkyl ester of a fatty acid with an equimolar amount of an alcohol amine (e.g., ethanolamine) at temperature of about 100° C. to about 110° C. Superamides contain little to no free amines.

An unmodified higher fatty acid or derivative having a hydrocarbon chain length of at least about nine carbon atoms may be ethoxylated using ethylene oxide in a molar ratio of 7:1 (seven degrees of ethoxylate per mole of fatty acid). Unmodified fatty acid ethoxylation produces a 90–95 percent ethoxylated fatty acid. However, conventional ethoxylated fatty acids used in the preparation of prior polymeric materials used a polyglycol ether of a higher fatty acid and not an unmodified higher fatty acid. Ethoxylation of a polyglycol ether of a higher fatty acid results in a poorly ethoxylated end-product. Furthermore, the commercially available ethoxylated fatty acids based on polyglycol ether show significantly lower end-product yields due to the presence of free polyethylene glycol. A lower degree of ethoxylation of the fatty acid results in an inferior effect of the material and hence larger quantities to achieve same result.

The ethoxylated alcohol and the amide are blended together under conditions such that the formed blend does not experience phase inversion from a liquid solution to a solid. It has been determined that isothermally blending, as by mixing, the alcohol and amide at a temperature of about 55° C. to about 58° C. with gentle mixing results in a solution, which does not solidify, and that the solution viscosity does not significantly change when the solution is cooled to a temperature below about 55° C. to about 58° C. Heretofore, it has not been possible to create such a blend that was not also temperature sensitive. An ethoxylated fatty acid is subsequently contacted, as by mixing, with the blend at a constant temperature of about 55° C. to about 58° C. to result in the polymeric material.

The particular hydrocarbon chain length of each of the ethoxylated alcohol, the ethoxylated fatty acid, and the alkyl ester of a fatty acid are preferably selected according to the compositional make-up of the fuel. Generally, it is believed that the selected hydrocarbon chain length of the ethoxylated alcohol and the ethoxylated fatty acid should be similar to the average chain length of the hydrocarbon compounds comprising the fuel. It is also believed that an even higher-performance material may be produced by forming an individual additive corresponding to each hydrocarbon constituent of the fuel, and subsequently blending the formed additives to form one stabilizing additive based on the relative concentration of the hydrocarbon constituents in the fuel. The greater the variety of hydrocarbon constituents, the more desirable it would be to make a blend of additives corresponding to selected hydrocarbon constituents of the fuel. Hence, for a diesel fuel, which is known to contain approximately twenty hydrocarbon constituents having chain lengths from about eight to about 30 carbon atoms, it would be advantageous to make an additive for a number of these constituents and then blend the additives into one stabilizing additive based on the relative concentration of each constituent.

Accordingly, an alternative and/or in addition to the polymeric material is a mixture of ethoxylated fatty alcohols, a cetane booster, and a demulsifier. More specifically, the mixture includes two different ethoxylated fatty alcohols having a hydrocarbon chain length of about 9 to about 13 carbon atoms, the two alcohols being present in a molar ratio with respect to each other of about 1:3 to about 3:1, inclusive. Preferably, the hydrocarbon chain length of the ethoxylated fatty alcohols is about 9 to about 11 carbon atoms. The mixture also contains a cetane booster in amount of 0 vol. % to about 10 vol. %, based on the volume of the mixture. Furthermore, the mixture also includes a demulsifier in an amount less than about 5 vol. %, and preferably less than about 1 vol. % based on the volume of the mixture. It is possible, however, to prepare the mixture without the cetane booster and to admix the cetane booster directly into the composition.

A suitable cetane booster for use in the mixture is selected from the group comprising, consisting essentially of, and/or consisting of 2-ethylhexylnitrate, tertiary butyl peroxide, diethylene glycol methyl ether, cyclohexanol, and mixtures thereof. The amount of cetane booster present in the mixture is a function of the cetane value of the particular diesel fuel and the amount of ethanol present in the particular fuel composition. Generally, the lower the diesel fuel cetane value, the higher the amount of the cetane booster. Similarly, because ethanol typically acts as a cetane depressant, the higher the concentration of ethanol in the solution, the more cetane booster necessary in the mixture. For example, when using a diesel fuel having a cetane value of about 50 or higher, the amount of cetane preferred is about 0.2 vol. % based on the volume of the composition, whereas when the cetane value of the diesel fuel is 40, the amount of cetane preferred is higher, such as greater than about 0.35 vol. % based on the volume of the composition.

The fuel composition also includes an alkyl ester of a fatty acid. Preferably the alkyl ester of a fatty acid has a hydrocarbon chain length of about 4 to about 22 carbon atoms, and preferably about 7 to about 18 carbon atoms. Such fatty acids are generally derived from animal and/or vegetable fats and oils. In accordance with the invention, the alkyl ester preferably is a soy bean oil-derived methyl ester or an ethyl ester.

The amount of alkyl ester blended to form the inventive fuel composition preferably is in a range of about 0.1 vol. % to about 4.5 vol. % based on the total volume of the fuel composition. In one preferred embodiment, the amount of alkyl ester is present in the solution in a range of about 0.1 vol. % to about 0.2 vol. %, more preferably about 0.13 vol. % to about 0.16 vol. %, and most preferably about 0.14 vol. % to about 0.16 vol. %, based on the total volume of the fuel composition. In another preferred embodiment, the amount of alkyl ester is present in the solution in a range of about 1.5 vol. % to about 4.5 vol. %, more preferably about 1.5 vol. % to about 3 vol. %, and most preferably about 1.5 vol. % to about 2.5 vol. %, based on the total volume of the fuel composition.

While not intending to be bound by any particular theory, it is believed that the amount of the alkyl ester present in the solution is dependent upon the concentration of ethanol and water in the solution, and the amount of ethoxylated fatty alcohols making up the stabilizing additive. It is believed that the ethanol and water decrease the lubricity of the overall composition, whereas the ethoxylated fatty alcohols have an opposite effect on the lubricity of the overall fuel composition. The alkyl ester, therefore, is selected and present in the solution in an effort to balance the lubricity effects to more precisely emulate the lubricity of the base diesel fuel used in the fuel composition.

Additionally, the concentration of alkyl ester in the fuel composition depends upon the temperature at which the combustion ignition engine is expected to operate at. For example, during the colder winter months (e.g., when temperatures may be as low as about minus 20° C., it is believed that the amount of alkyl esters necessary in the fuel composition will be less than that necessary during warmer summer months (e.g., when fuel tank temperatures approach about 65° C.).

The solubilized fuel composition of the invention provides a number of benefits. For example, the fuel composition remains stable over a range of ambient temperatures (about −20° C. to about +65° C.) through winter and summer months. Additionally, the fuel composition remains a clear, transparent stable solution even in the presence of water-contamination of up to about 5 vol. %. Additionally, the fuel composition meets the federal minimum cetane number requirement and meets or exceeds ASTM D975 diesel fuel specifications and, therefore, can be classified as a "splash blendable" fuel (i.e., can be prepared readily within minutes without the necessity of any energy-intensive blending, recirculating, and/or heating procedures). Still further, the fuel composition meets fuel lubricity minimum requirements based on Scuffing Load Ball on Cylinder Lubrication Evaluation and/or High Frequency Reciprocating Rig test methods. It is believed that the fuel composition when burned in an unmodified combustion ignition engine results in a reduced tail-pipe sulfur emissions when compared to a base No. 2 diesel fuel. Furthermore, a reduction in aromatic content of about 20% is achieved in the formulation of the fuel composition which will lead to improved emissions characteristics.

EXAMPLES

The following examples are provided to further illustrate the invention but are not intended to limit the scope thereof Specifically, the following examples are provided to illustrate the composition, manufacture and physical characteristics of the inventive fuel composition versus conventional diesel fuel.

Example 1 includes a comparison of physical properties of a fuel composition according to the invention and a No. 2 diesel fuel. Example 2 provides a comparison of the distillation data of a base No. 2 diesel fuel to winter- and summer-blends of a fuel composition of the invention. Examples 3 and 4 illustrate alternative formulations of fuel compositions according to the invention.

Example 1

A fuel composition was prepared for purposes of comparing physical characteristics to that of base No. 2 diesel fuel. The fuel composition was prepared by combining less than about 5 vol. % of a stabilizing additive with about 0.15 vol. % of a soy methyl ester. This mixture was then combined with about 15 vol. % of anhydrous ethanol, and to this mixture was added about 80 vol. % No. 2 diesel fuel. No stirring or external mixing was necessary to form a clear, transparent solution.

The prepared fuel composition was tested by various standardized tests to determine physical property data, which are provided in the following Table I along with the corresponding physical property data for base No. 2 diesel fuel, for comparison purposes.

TABLE I

| Property | Test Method | No. 2 Diesel | Inventive Fuel |
|---|---|---|---|
| Water & Sediment (% max) | ASTM D1796 | 0.05 | 0 |
| Distillation (% vol. rec. T-90° C.) | ASTM D86 | 332 | 311 |
| Kinematic Viscosity (40° C., (cSt)) | ASTM D445 | 1.9 to 4.1 | 2.25 |
| Ash (% max) | ASTM D482 | 0.01 | 0.001 |
| Sulfur (% max) | ASTM D2622 | 0.05 | 0.01 |
| Copper Corrosion @ 3-hour max | ASTM D130 | 3b | 1a |
| Cetane Number, min | ASTM D613 | 40 | 45 |
| Cetane Index, min | ASTM D4737 | 45 | 42 |
| Rams, Carbon (10% res) | ASTM D4530 | 0.35 | 0.22 |
| API Gravity, max | ASTM D287 | 39 | 38 |
| Lubricity (g) min | ASTM D6078 | 3100 | 5200 |
| Accel. Stability (pass/fail test) | Octel F-21 | Pass | Pass |
| Cloud Point (° C.) | D2500 | −15 | −5 |
| LTFT at −11° C. (pass/fail test) | D4539 | Pass | Pass |
| LTFT at −19° C. (pass/fail test) | D4539 | Fail | Pass |

From a review of the physical property data provided in Table I it is apparent that the prepared fuel composition exhibits characteristics very similar to those of the base No. 2 diesel fuel.

Example 2

A winter blend of ethanol and No. 2 diesel was prepared for use in a compression-ignition engine designed to operate at an ambient temperature range of about minus 19° C. to about minus 10° C. The additive composition and dosage varied based on diesel fuel cetane rating, water content of ethanol, ambient use temperature (winter vs. summer). For a No. 2 diesel fuel with a cetane rating of 44.5, fuel grade ethanol with 0.8% (by volume) water, and moisture-free soy methyl ester, the following composition was prepared.

The winter fuel formulation contained the following quantities of each of the component:

| Component | Volume Percent |
| --- | --- |
| No. 2 diesel fuel | 79.0 |
| Fuel-grade ethanol | 15.0 |
| Soy methyl ester | 0.15 |
| 2-ethylhexyl nitrate (EHN) | 0.35 |
| Additive* | 5.50 |

*a variable high additive dosage is used during winter months corresponding to an ambient use temperature range of about minus 19° C. to about minus 10° C. Any changes in the level of additive concentration are compensated by corresponding changes in diesel fuel concentration.

| Additive Composition | |
| --- | --- |
| Component | Volume Percent |
| NEODOL 91-2.5 | 32.0 |
| NEODOL 1-3 | 64.5 |
| Nalco demulsifier #EC5459A | 3.5 |

The two NEODOL alcohols were first mixed at room temperature followed by the Nalco demulsifier. The cetane booster (EHN) was then added to the pre-mixed additive mixture followed by soy methyl ester, ethanol, and the No. 2 diesel. No stirring or external mixing was necessary.

A summer blend similar to the winter blend described above was designed for summer months from ethanol and No. 2 diesel and was prepared for use in a compression-ignition engine designed to operate at any ambient temperature between about 10° C. to about 65° C. (fuel tank temperature). For a No. 2 diesel fuel with a cetane rating of 44.5, fuel grade ethanol with 0.8% (by volume) water, and moisture free soy methyl ester, the following composition was prepared.

The summer fuel formulation contains the following quantities of each of the component:

| Component | Volume Percent |
| --- | --- |
| No. 2 diesel fuel | 83.0 |
| Fuel-grade ethanol | 15.0 |
| Soy methyl ester | 0.25 |
| t-butyl peroxide (TBP) | 0.25 |
| Additive* | 1.50 |

*variable low additive concentration was used during summer months which corresponded to an ambient temperature range of about 10° C. to about 65° C. (fuel tank temperature). The changes in the level of additive concentration were compensated by corresponding changes in the diesel fuel concentration.

| Additive Composition | |
| --- | --- |
| Component | Volume Percent |
| NEODOL 91-2.5 | 62.0 |
| NEODOL 1-3 | 31.0 |
| Nalco demulsifier #EC5459A | 7.0 |

The two NEODOL alcohols were first mixed at room temperature followed by the cetane booster (TBP), and the Nalco demulsifier. The resultant additive mixture was then mixed with soy methyl ester, followed by splash blending with ethanol, and the No. 2 diesel. No stirring or external mixing was necessary.

The distillation data for both of the winter and summer blends and that of the No. 2 diesel fuel are shown in Table II below:

TABLE II

| Volume Distilled (%) | No. 2 Diesel (° F.) | Winter-Blend Fuel (° F.) | Summer-Blend Fuel (° F.) |
| --- | --- | --- | --- |
| IBP | 338.1 | 170.2 | 169.8 |
| 5 | 365.1 | 172.2 | 171.8 |
| 10 | 396.5 | 173.1 | 173.1 |
| 20 | 423.6 | 377.9 | 378.6 |
| 30 | 447.4 | 427.8 | 431.2 |
| 40 | 469.4 | 454.4 | 451.4 |
| 50 | 488.1 | 478.0 | 481.4 |
| 60 | 510.9 | 504.5 | 506.8 |
| 70 | 534.0 | 530.9 | 533.3 |
| 80 | 563.9 | 561.0 | 561.0 |
| 90 | 596.3 | 593.2 | 592.1 |

Although the distillation curve is similar, there is slight difference in both the initial boiling point (IBP) and middle and end temperatures.

Example 3

A fuel composition was prepared for use in a combustion ignition engine operating at an ambient temperature of about minus 10° C. to about 10° C. prepared in a manner similar to that described in Example 2, above. Compositional differences between the fuel composition here, however, included adjusting the molar ratio of the NEODOL alcohols to 1:1, stabilizing additive concentration to 3.5 vol. %, soy methyl ester concentration to 2.0 vol. %, and cetane booster (EHN) concentration to 0.3 vol. %, and the Nalco demulsifier concentration to 5.0 vol. %.

| Solution Composition | |
| --- | --- |
| Component | Volume Percent |
| No. 2 diesel fuel | 81.0 |
| Fuel-grade ethanol | 15.0 |
| Soy methyl ester | 0.20 |
| 2-ethylhexyl nitrate (EHN) | 0.30 |
| Additive* | 3.50 |

*a variable high additive dosage can be used within this composition to be selectively adjusted to the ambient use temperature range within about minus 10° C. to about 10° C. Any changes in the level of additive concentration were compensated by corresponding changes in the diesel fuel concentration.

| Additive Composition | |
| --- | --- |
| Component | Volume Percent |
| NEODOL 91-2.5 | 47.5 |
| NEODOL 1-3 | 47.5 |
| Nalco demulsifier #EC5459A | 5.0 |

The blending procedure was the same as that described in Example 2 above.

Example 4

A premium blend of ethanol and No. 2 diesel was prepared for use in a compression-ignition engine designed to operate at an ambient temperature range of about minus 19° C. to about 65° C. The additive composition and dosage varied based on diesel fuel cetane rating, water content of ethanol, ambient use temperature (winter vs. summer), and cosolvent present.

For a No. 2 diesel fuel with a cetane rating of 42, fuel grade ethanol with 1.2% (volume) water, and moisture free soy methyl ester, the following composition was prepared.

The fuel formulation contained the following quantities of each of the component:

| Component | Volume Percent |
|---|---|
| No. 2 diesel fuel | 72.0 |
| Fuel-grade ethanol | 15.0 |
| Soy methyl ester | 2.0 |
| γ-Valerolactone | 5.0 |
| 2-ethylhexyl nitrate | 0.35 |
| Additive* | 5.65 |

*a variable additive dosage can be used during summer and winter months corresponding to an ambient use temperature range of about minus 19° C. to about 65° C. Any changes in the level of additive dosage were compensated by corresponding changes in the diesel fuel concentration.

| Additive Composition | |
|---|---|
| Component | Volume Percent |
| NEODOL 91-2.5 | 29.0 |
| NEODOL 1-3 | 22.5 |
| Nalco demulsifier #EC5459A | 3.50 |
| Reaction Product Additive | 45.0 |

The reaction product additive of the additive composition was prepared by reacting (a) a mixture of NEODOL 91–2.5 and NEODOL 1–6 with (b) diethanolamide to form an intermediate, which was subsequently reacted with oleic acid. The mixture of NEODOL alcohols made up about 50 percent of the reaction product additive, and the diethanolamide and oleic acid each comprised about 25 volume percent of the reaction product additive, based on the total volume of the reaction product additive. The additive composition was prepared by first mixing NEODOL 91–2.5 with NEODOL 1–3 at room temperature followed by admixing the reaction product additive, the demulsifier, and the cetane booster (EHN). The resultant additive mixture is then mixed with soy methyl ester, followed by mixing it with γ-valerolactone, ethanol, and the No. 2 diesel fuel. No stirring or external mixing was necessary.

The foregoing description is given for clearness of understanding only, and no unnecessary limitations should be understood therefrom, as modifications within the scope of the invention may be apparent to those skilled in the art.

What is claimed is:

1. A fuel composition comprising a solution of:
   (a) a diesel fuel;
   (b) ethanol;
   (c) an alkyl ester of a fatty acid;
   (d) a stabilizing additive selected from the group consisting of:
      (i) a mixture comprising two different ethoxylated fatty alcohols each having a hydrocarbon chain length of about 9 to about 13 carbon atoms present in a molar ratio with respect to the other of about 1:3 to about 3:1, inclusive; 0 volume percent (vol. %) to about 10 vol. %, inclusive, based on the volume of the mixture, of a cetane booster; and less than about 5 vol. % of a demulsifier based on the volume of the mixture; and,
      (ii) the reaction product of (1) a mixture of an ethoxylated alcohol and an amide, said ethoxylated alcohol comprising at least about 75 weight percent of at least one linear straight chain alcohol having a hydrocarbon chain length of about 9 to about 15 carbon atoms, and said amide being a substantially equimolar reaction product of an alcohol amine and an alkyl ester of a fatty acid; and, (2) an ethoxylated fatty acid or derivative thereof having a hydrocarbon chain length of about 9 to about 15 carbon atoms; and,
   (e) optionally, a cosolvent selected from the group consisting of alkyl alcohols having a hydrocarbon chain length of about three to about six, inclusive, naphtha, γ-valerolactone, kerosene, hydrocarbons having a chain length of greater than about 50, and mixtures thereof.

2. The fuel composition of claim 1, wherein the diesel fuel has a cetane number of about 25 to about 50, inclusive.

3. The fuel composition of claim 2, wherein the alkyl ester of a fatty acid has a hydrocarbon chain length of about 7 to about 18 carbon atoms.

4. The fuel composition of claim 1, wherein the alkyl ester is a methyl ester or an ethyl ester.

5. The fuel composition of claim 1, wherein in the mixture (d)(i), the ethoxylated fatty alcohols have hydrocarbon chain lengths of about 9 to about 11 carbon atoms.

6. The fuel composition of claim 1, wherein in the mixture (d)(i), the demulsifier is present in an amount of 0 vol. % to about 2 vol. %, inclusive, based on the volume of the mixture of (d)(i).

7. The fuel composition of claim 1, wherein the cetane booster is selected from the group consisting of 2-ethylhexylnitrate, tertiary butyl peroxide, diethylene glycol methyl ether, cyclohexanol, and mixtures thereof.

8. The fuel composition of claim 1 comprising:
   (a) about 60 vol. % to about 89 vol. %, inclusive, diesel fuel;
   (b) about 10 vol. % to about 18 vol. %, inclusive, ethanol;
   (c) about 0.1 vol. % to about 4.5 vol. %, inclusive, of an alkyl ester;
   (d) about 0.5 vol. % to about 10 vol. %, inclusive, of a stabilizing additive; and,
   (e) 0 vol. % to about 10 vol. %, inclusive, of the cosolvent.

9. The composition of claim 8 comprising:
   (a) about 72 vol. % to about 89 vol. %, inclusive, diesel fuel;
   (b) about 10 vol. % to about 18 vol. %, inclusive, ethanol;
   (c) about 0.1 vol. % to about 0.2 vol. %, inclusive, of the alkyl ester of a fatty acid; and,
   (d) about 0.5 vol. % to about 10 vol. %, inclusive, of said additive, the additive being a mixture comprising two different ethoxylated fatty alcohols having a hydrocarbon chain length of about 9 to about 13 carbon atoms present in a molar ratio of with respect to the other of about 1:3 to about 3:1, inclusive; 0 vol. % to about 10 vol. %, inclusive, based on the volume of the mixture, of a cetane booster; and less than about 5 vol. % of a demulsifier based on the volume of the mixture.

10. The composition of claim 9 comprising:
   (a) about 78.5 vol. % to about 86 vol. %, inclusive, diesel fuel;
   (b) about 13 vol. % to about 16 vol. %, inclusive, ethanol;
   (c) about 0.13 vol. % to about 0.16 vol. %, inclusive, ester of a fatty acid; and,
   (d) about 0.7 vol. % to about 5.35 vol. %, inclusive, of the additive.

11. The composition of claim 10 comprising:
   (a) about 82.6 vol. % to about 85 vol. %, inclusive, diesel fuel;
   (b) about 14 vol. % to about 15 vol. %, inclusive, ethanol;

(c) about 0.14 vol. % to about 0.15 vol. %, inclusive, of the alkyl ester of a fatty acid; and, (d) about 1.2 vol. % to about 2.25 vol. %, inclusive, of the additive.

12. The composition of claim 8 comprising:

(a) about 60 vol. % to about 84 vol. %, inclusive, diesel fuel;

(b) about 10 vol. % to about 18 vol. %, inclusive, ethanol;

(c) about 1.5 vol. % to about 4.5 vol. %, inclusive, of the alkyl ester of a fatty acid;

(d) about 0.5 vol. % to about 7.5 vol. %, inclusive, of the additive; and, (e) about 4 vol. % to about 10 vol. %, inclusive, of the co-solvent.

13. The composition of claim 12 comprising:

(a) about 67 vol. % to about 78.5 vol. %, inclusive, diesel fuel;

(b) about 13 vol. % to about 16 vol. %, inclusive, ethanol;

(c) about 1.5 vol. % to about 3 vol. %, inclusive, of the alkyl ester of a fatty acid;

(d) about 1 vol. % to about 6 vol. %, inclusive, of the additive; and, (e) about 6 vol. % to about 8 vol. %, inclusive, of the co-solvent.

14. The composition of claim 13 comprising:

(a) about 69 vol. % to about 74.6 vol. %, inclusive, diesel fuel;

(b) about 14 vol. % to about 15 vol. %, inclusive, ethanol;

(c) about 1.5 vol. % to about 2.5 vol. %, inclusive, of the alkyl ester of a fatty acid;

(d) about 3 vol. % to about 6 vol. %, inclusive, of the additive; and, (e) about 6.9 vol. % to about 7.5 vol. %, inclusive, of the co-solvent.

* * * * *